Sept. 8, 1942.  J. H. KELLER  2,295,115
RETRACTABLE WATER HEATER
Filed Oct. 21, 1939
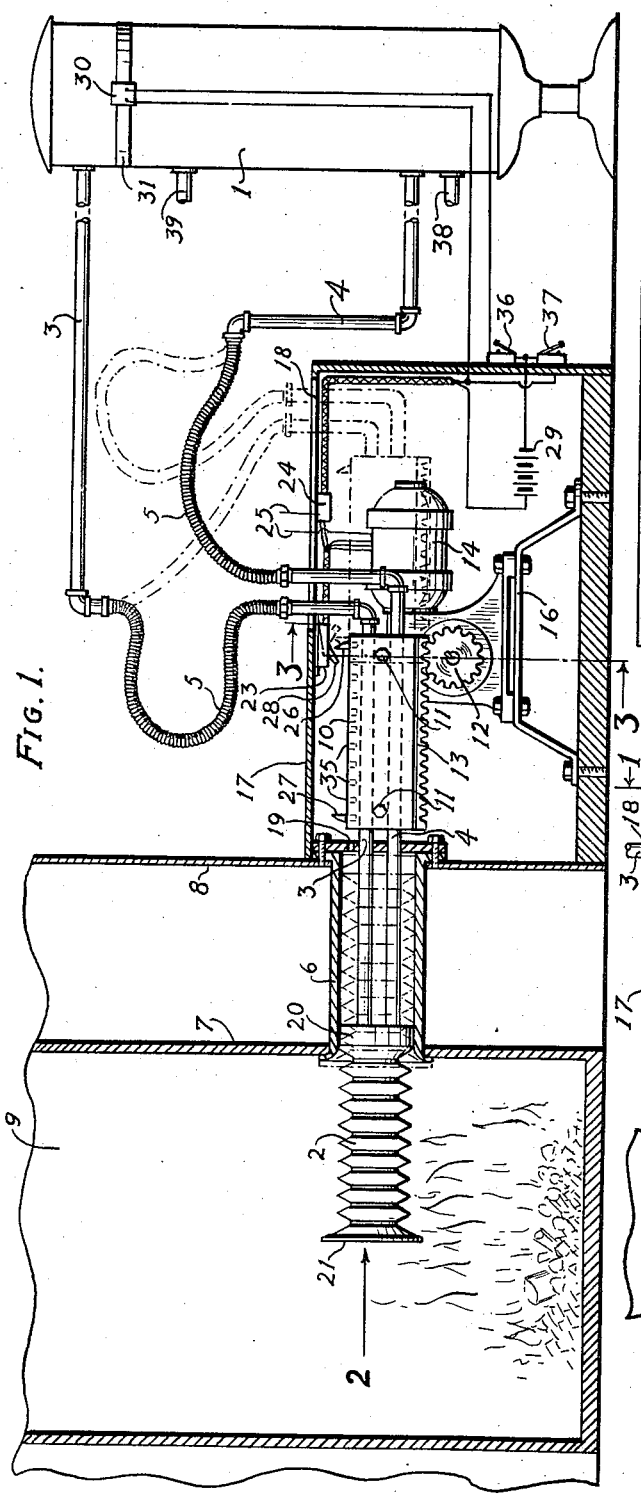
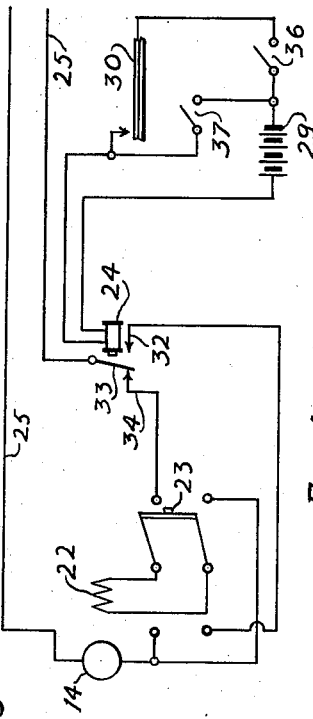
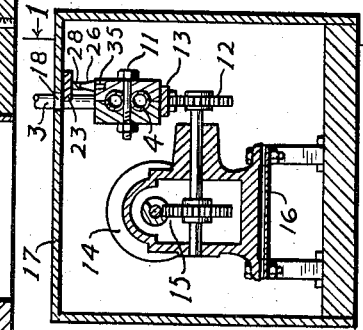
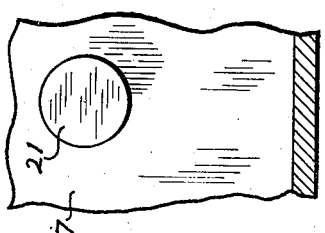
INVENTOR
Jay H. Keller
BY
ATTORNEY Patented Sept. 8, 1942

2,295,115

UNITED STATES PATENT OFFICE 2,295,115

RETRACTABLE WATER HEATER

Jay H. Keller, Portland, Oreg.; Elizabeth B. Keller administratrix of said Jay H. Keller, deceased Application October 21, 1939, Serial No. 300,590

5 Claims. (Cl. 122—20)

My invention relates to water heating apparatus, and it relates more particularly to a water heating system adapted automatically to adjust itself to variations in the demand for hot water as well as to variations in the source of heat. If a water heating coil in a furnace, for example, has sufficient area exposed to the fire to heat water at an adequate rate when the fire is low and when large quantities of hot water are being used, said coil will overheat the water when the fire is higher or when less hot water is being used. Said overheating of the water is objectionable by the scalding water; the formation of steam in the hot water pipes; the backing up of hot water or steam into the cold water pipes, thus wasting heat, interfering with the cold water supply, and possibly damaging water meters; and damage to the heater and coils thereof by too high temperature thereof.

On the other hand, if said water heating coil has an area exposed to the fire sufficiently small so that over heating will not take place, said water will be insufficiently heated when the fire is low or when large amounts of water are used. In practice a heating area representing a compromise between the two aforesaid conditions has been used, with the result that the water has been overheated at times and underheated at other times.

The principal object of my invention is to provide means for heating water to a predetermined temperature by means of a varying source of heat and at a varying rate of withdrawal of said water. I achieve said object by providing a heating element having sufficient surface exposed to said source of heat to heat an adequate supply of water to said predetermined temperature even with a very low fire. I then prevent overheating of the water by providing means for partially removing said heating element automatically from the proximity of said source of heat when said water reaches said predetermined temperature, said means being adapted to return said heating element to said source of heat when said water temperature falls below said predetermined value. I find it possible and feasible to thus control the temperature to which said water is heated to within a range of less than one degree Fahrenheit under conditions which, without my invention, would result in a temperature variation of more than 100 degrees Fahrenheit.

A further object of my invention is to provide automatically retractable water heating means for the purpose hereinbefore described that will not function with unnecessary frequency, there- by wasting power and unnecessarily wearing the working parts thereof. Even when no hot water is being withdrawn, the temperature of said hot water is constantly being reduced by radiation, convection, and conduction of heat from pipes and storage tanks. Said heat losses would cause the aforesaid heating element to be returned automatically to the source of heat at frequent intervals without the withdrawal of any hot water if said heating element were wholly withdrawn from said source of heat. However, said heat losses are substantially constant, and I find that they may be substantially supplied by leaving a portion of said heating element exposed to the source of heat when said heating element is in its withdrawn position. In other words, I only partially withdraw said heating element from said source of heat to control the temperature of the water, leaving enough of it exposed to said heat to supply the fixed losses of the system.

A further object of my invention is to provide means for manually controlling the temperature to which water is heated by the automatically controlled means herein described when a water temperature different from the aforesaid predetermined temperature is desired temporarily. Said manual control may also be used to retract said heating element to facilitate refueling the furnace, or other combustion chamber, in which it may be used.

In the drawing:

Fig. 1 is a vertical sectional view of a water heater embodying my invention taken substantially on the line 1—1 Fig. 3, said heater being installed in a furnace and connected to a hot water storage tank;

Fig. 2 is a fragmentary view taken in the direction of the arrow 2 in Fig. 1;

Fig. 3 is a section taken substantially on the line 3—3 in Fig. 1; and

Fig. 4 is a schematic diagram of the electrical apparatus shown in Fig. 1.

Water may be supplied to tank 1 through pipe 38 and removed therefrom through pipe 39. Said water may be caused to flow to and from water heater 2 through pipes 3 and 4 by the well known thermo-syphon action, if desired, or a pump (not shown), might be provided to produce said circulation. I prefer to interpose flexible conduit sections 5 in each of pipes 3 and 4 for reasons hereinafter described.

Water heater 2 is slidably mounted in a tubular guide member 6 built into the double walls 7 and 8 of furnace 9. I prefer said guide member to be substantially as long as said heater, and if said walls 7 and 8 are not separated by sufficient space to accommodate said guide member therebetween, the latter should project outwardly from the furnace. The type of furnace with which my invention is used is a matter of no importance provided the position of the heater with respect to the source of heat accords with the principles herein set forth.

A crosshead 10, preferably made in two sections of heat insulating material held together by bolts 11 clamping pipes 3 and 4 therebetween, is adapted to be moved toward and away from furnace 9 by pinion 12 engaging rack 13 affixed to said cross head. Heater 2 may thus be moved into said furnace to the position shown by full lines in Fig. 1, or it may be retracted into the position shown in dot-and-dash lines in said figure, flexible conduit sections 5 bending during said movement. Pinion 12 may be driven by motor 14 through suitable reduction gearing 15 so that said heater may be moved by properly controlling said motor. Said motor and reduction gears may be mounted upon base members 16, and I prefer to place a cover 17 thereover, said cover being provided with a slot 18 through which pipes 3 and 4 may extend, said pipes moving therein with said crosshead.

A plate 19 may be provided for the outer end of guide member 6, if desired, to prevent air being drawn into said furnace therethrough. However, I prefer to provide said plate with a small aperture 19 in order that trapped air within said guide member shall not interfere with the movement of said heater.

In accordance with my invention, heater 2 should have sufficient heating surface exposed to the source of heat when in its inward position to heat water rapidly even though said source of heat be comparatively weak. To this end, I prefer to provide ridges or corrugations on said heater by welding together a number of dished annular steel sections, alternate sections facing in opposite directions, to form the body of said heater. Pipes 3 and 4 may be welded into the outer head 20 of said heater, if desired, and said head may be welded to said body.

Inner head 21 of said heater may also be welded thereto. The size of said inner head should be such that, with said heater withdrawn into guide member 6, sufficient heat will be transferred thereto to maintain the water in tank 1 at the desired temperature when no hot water is withdrawn from said tank. In other words, head 21 should be of sufficient area, considering its proximity to the source of heat with said heater in its withdrawn position, to supply the heat losses of the system.

I will now describe the means which I prefer for controlling the movement of heater 2. Motor 14 should be of a reversible type, and for convenience I will consider it to be a series motor, other types of motors being similarly reversible. To reverse the direction of rotation of said motor, I prefer to interchange the connections of its field winding, indicated at 22 in Fig. 4, by means of double pole, double throw switch 23, said switch having its end poles cross-connected like the ordinary reversing switch except that relay 24 is interposed in one of said cross connections. Thus, as viewed in Fig. 4, said motor will rotate with switch 23 thrown to the left only if said relay is closed, and with said switch thrown to the right said motor will rotate in the opposite direction only if said relay is in its open position. Relay 24 should be of the three wire type adapted to close one circuit in its closed position, and to close another circuit in its open position, operating like a single pole double throw switch. Said motor may be supplied with power from any suitable source through wires 25.

Switch 23 may be mounted on the under side of cover 17 at a point midway of the travel of crosshead 10, and directly over said crosshead so that fingers 26 and 27 carried thereby will engage lever 28 of said switch, throwing the same to its opposite position.

Relay 24 may be actuated by a circuit including battery 29 or other source of power and thermostat 30. Said thermostat may be fastened to water tank 1 by means of a strap 31 so that it will be heated as said tank is heated. Said thermostat may be of the type which closes its circuit when hot and opens said circuit when cold, although the reverse type would be equally applicable. In either case, said thermostat should be adjustable so that the temperature at which it operates may be varied. Thermostats of this type are well known, and will not here be described in detail.

To make clear the operation of the aforesaid control apparatus, suppose heater 2 is in its inward position as shown in full lines in Fig. 1, and that switch 23 is thrown to the left as shown in Figs. 1 and 4. Suppose, further, that relay 24 is open, thermostat 30 being open and tank 1 at a low temperature. It is apparent that, under these conditions, motor 14 will be disconnected from its power supply since contact 32 of said relay will not engage armature 33 thereof.

Now suppose that heater 2 heats the water in tank 1 until thermostat 30 closes, thereby closing relay 24 and starting motor 14. It will be understood that said motor will operate in the proper direction to retract heater 2. When said heater is fully retracted, to the position shown in dot-and-dash lines in Fig. 1, finger 27 will throw switch 23 to the right, thus stopping said motor. Switch 23 should be of a snap type that will not come to rest in an intermediate position. Said motor will now be disconnected from its power supply since contact 34 will not engage armature 33.

Suppose now that hot water is withdrawn from tank 1 cooling the same until thermostat 30 opens, thus causing relay 24 to open, connecting armature 33 to contact 34. Motor 14 will thus be started and switch 23 being in its opposite position, it will run in a direction opposite to that previously described, thus moving heater 2 back into the furnace. Thus, when the temperature of tank 1 increases to a predetermined value, heater 2 will be retracted, and when said temperature decreases below a predetermined value, said heater will be moved back into the furnace.

It will be apparent that a like result would be achieved if thermostat 30 were of the type that opened as it became hot provided the armature connections to motor 14 were reversed. Also, relay 24 might be dispensed with if a three wire thermostat capable of controlling motor 14 directly were provided instead of thermostat 30. In this case, said three wire thermostat might be connected in the circuit exactly like three wire relay 24, armature 33 becoming the moving element of said thermostat. However, I prefer to utilize a relay between said thermostat and the motor thereby reducing the current flowing thru said thermostat.

The structure thus far described will automatically maintain the water in tank 1 very accurately at the predetermined temperature for which thermostat 30 is set, and heater head 21 will receive sufficient heat to supply the heat losses of the system without unnecessary operation of said equipment. However, conditions may arise whereby said head receives insufficient heat to supply said losses, in which case it would be desirable to retract said heater only partially from the furnace, leaving a portion of the body of the heater as well as said inner head exposed to the source of heat. This result may be achieved in a simple manner by merely moving finger 27 to the right on crosshead 10. Said finger will then function to throw switch 23, thus stopping motor 14, sooner as said heater is being retracted, leaving a portion of said heater in the furnace. To facilitate moving said fingers, I prefer to mount the same in one of a series of holes 35 in crosshead 10. If, for any reason, it were desired to stop the inward movement of said heater before it reached the end of its travel into the furnace, this might be similarly accomplished by moving finger 26 to the left in said holes.

I contemplate the use of a thermostat that may be readily adjusted to vary the temperature to which water will be heated by my invention. However, it may sometimes be desirable to control said temperature manually, and for this purpose I provide manual means for controlling the motor to move said heater. Said manual means consist merely of two switches, 36 and 37. If heater 2 is found to be in its inward position, thermostat 30 will be open, tank 1 being too cool. If, then, it is desired to retract said heater, it is only necessary to close switch 37 until said heater is retracted the desired amount. When said switch is released, said heater will remain stationary since relay 24 will not be in the proper position to operate said motor with switch 23 thrown to the left. Or if heater 2 is fully retracted, switch 37 may be left closed to keep it there.

On the other hand, if heater 2 should be found retracted, and it should be desired to move it inward, this may be done by opening switch 36 until said heater has been moved the desired amount, or if switch 36 be left open said heater will remain in its inward position.

I claim:

1. The combination with a firebox furnace of water heating apparatus comprising an elongated water heater, a water system of substantial capacity including conduits defining a closed circuit leading to and from said heater, automatic means including a heat responsive device for selectively retracting and inserting said heater into and out of said firebox in the presence and absence, respectively, of a predetermined temperature in said water system.

2. Water heating apparatus comprising an elongated heater element adapted to extend into the combustion chamber of a furnace, a water system of substantial capacity including conduits defining a closed path leading to and from said heater, a chambered housing extending laterally from said combustion chamber and having a mouth opening into the latter, said housing closely encompassing said heater element and accommodating movement of said heater longitudinally thereof, and means including a thermostatic control responsive to temperature variations in said water system for producing movement of said heater element within said housing.

3. Water heating apparatus comprising an elongated heater element adapted to extend into the combustion chamber of a furnace, a water system of substantial capacity including conduits defining a closed path leading to and from said heater, a chambered housing extending laterally from said combustion chamber and having a mouth opening into the latter, said housing closely encompassing said heater element and accommodating movement of said heater longitudinally thereof, said heater having a head portion of substantial area lying without said housing, said head being slightly larger in diameter than said chambered housing and in one position said head overlying and closing the mouth of said housing.

4. Water heating apparatus comprising an elongated heater element adapted to extend into the combustion chamber of a furnace, a water system of substantial capacity including conduits defining a closed path leading to and from said heater, a chambered housing extending laterally from said combustion chamber and having a mouth opening into the latter, said housing closely encompassing said heater element and accommodating movement of said heater longitudinally thereof, said heater having a head portion of substantial area lying without said housing, said head being slightly larger in diameter than said chambered housing and in one position said head overlying and closing the mouth of said housing, said head being proportioned with respect to said water system to provide a heat absorbing surface to supply heat to said system for balancing heat losses from said system when water is not withdrawn therefrom.

5. Water heating apparatus comprising an elongated heater element adapted to extend into the combustion chamber of a furnace, a water system of substantial capacity including conduits defining a closed path leading to and from said heater, a chambered housing extending laterally from said combustion chamber and having a mouth opening into the latter, said housing closely encompassing said heater element and accommodating movement of said heater longitudinally thereof, said heater having a head portion of substantial area lying without said housing, and means including a thermostatic control responsive to temperature variations in said water system for producing movement of said heater element within said housing, said head being slightly larger in diameter than said chambered housing and in one position said head overlying and closing the mouth of said housing, said head being proportioned with respect to said water system to provide a heat absorbing surface to supply heat to said system for balancing heat losses from said system when water is not withdrawn therefrom.

JAY H. KELLER.